United States Patent Office 2,694,002
Patented Nov. 9, 1954

2,694,002

POLYMERIZATION OF OLEFINS

George E. Hays, Bartlesville, Okla., assignor to Phillips Petroleum Company, a corporation of Delaware No Drawing. Application August 11, 1949, Serial No. 109,800

11 Claims. (Cl. 44—80)

This invention relates to the conversion of normally gaseous hydrocarbons into normally liquid hydrocarbons of higher molecular weight by means of catalytic polymerizing agents. In one of its aspects, this invention relates to the production by catalytic means of normally liquid polymers suitable for motor fuel with a minimum formation both of non-volatile heavier products and of lighter polymers.

The tendency to polymerize of the various gaseous mono-olefins varies considerably when using different catalysts and also the same catalyst. Catalysts and conditions have been varied in an attempt to find the best method by which to produce from normally gaseous hydrocarbons, polymers which will be substantially entirely in the gasoline boiling range without undue formation of undesirably light or heavy polymers. Both liquid and solid phosphoric acid catalysts have been employed to effect polymerization, particularly solid phosphoric acid type catalysts which consist of varying amounts of different phosphoric acids or of metallic phosphates, such as copper phosphate, supported on solid carriers such as kieselguhr, diatomaceous earths, fuller's earth and various clays such as bentonite, etc. However, these phosphoric acid type catalysts almost exclusively form low molecular weight polymers which cannot be blended to good advantage with natural or light synthetic gasolines. Another type catalyst which has been extensively employed in the polymerization of normally gaseous olefins is a silica-alumina catalyst which is composed of the oxides of silicon and aluminum blended in controlled ratios. When this silica-alumina catalyst is employed at high conversion levels, the polymerization products tend to contain hydrocarbons of high boiling point unsuitable for gasoline.

Various methods have been devised to reduce the undesirable products which have been obtained by the use of the various types of catalysts; for example, it has been proposed to subject the olefins to non-catalytic thermal polymerization in a first zone and to a subsequent catalytic polymerization after separation of the polymerized material from the first polymerization. It has also been proposed to polymerize the olefins in successive catalytic stages, for example, employing a phosphoric acid catalyst in which a solid carrier is progressively more richly impregnated with phosphoric acid and the catalyst thereby more active in successive zones so that the olefins may be selectively polymerized in the order of their reactivity and separated between each stage. These olefins have also been polymerized in successive zones employing a silica-alumina catalyst under a different set of conditions in the successive zones in order that the olefins may be selectively polymerized and separated between polymerization zones so that the extent of polymerization and the formation of heavier polymers may be reduced. All of the proposed methods are subject to various difficulties and objections in the formation of excessive amounts of undesired products when the conversion is conducted at a high level and in the requirement of extra equipment.

I have now found an improved process by which the production of a satisfactory polymer gasoline is effected. By my process, the normally gaseous olefins of from three to five carbon atoms are treated first in the presence of a silica-alumina catalyst in a first polymerization zone and are further treated in the presence of a phosphoric acid type catalyst in a second polymerization zone. Conversion in the first zone is maintained at a relatively low conversion level of 40–60 percent and conversion in the second zone is maintained at a rate such that the total conversion from the two polymerization steps will be between 75–95 percent. By operating according to this process, the formation of heavy polymers is reduced to a minimum and the production of light polymers which is common in the use of a phosphoric acid type catalyst is also reduced. Polymer gasoline produced contains a high percentage of octyl, nonyl, decyl, undecyl, and dodecyl polymers and a small percentage of the lighter amyl, hexyl, and heptyl polymers and also a low percentage of high boiling hydrocarbons. Thus it is possible to take advantage of the most desirable characteristics of each type of catalyst for polymerization and effect a maximum total conversion without the necessity of forming with the desired products an excessive amount of undesirable products of lighter or heavier polymers.

The polymerized products of the present process are substantially entirely in the gasoline boiling range, predominantly in the higher-boiling range of gasoline. The gasoline product is particularly desirable as a blending stock to be added to either natural gasoline extracted from a natural gas stream or synthetic light gasoline produced by synthesizing carbon monoxide and hydrogen as in the so-called Fischer-Tropsch process to give a blended gasoline of desired characteristics. The exact proportion in which the heavy gasoline produced by the present process and a light gasoline may be blended will depend of course upon the characteristics of each of these materials and upon the specifications to be met by the blend, particularly with respect to vapor pressure. Thus it may be that one part of the polymer gasoline may be blended with four parts of a light gasoline to produce a satisfactory motor fuel.

Suitable feed stocks include mixtures of normally gaseous olefins from any source and particularly mixtures of such olefins with paraffinic hydrocarbons. It is preferred that the feed to the process contain between 10 and 30 mol percent of olefins which are predominantly propylenes and butylenes. If any particular feed stock is below the desired olefin concentration, additional highly concentrated olefinic material may be added to bring up the concentration thereof or, if the olefin concentration is too high, the feed stock may be diluted with gaseous paraffinic hydrocarbons to prepare a feed of the desired composition. Unconverted olefins and unreacted paraffins boiling below the gasoline range can be recycled, if desired, as a means of lowering the olefin content of the fresh feed to the desired level. A particularly satisfactory and readily available olefinic feed stream is a $C_3$–$C_4$ cut from refining processes. These refinery cuts possess varying olefin contents but the composition may be adjusted as indicated. The feedstream may and probably will contain minor amounts of lighter and heavier olefins, particularly ethylene and amylenes, but these olefins are not objectionable in the present process and are probably less reactive.

Conversion conditions will include a temperature in the range of 200° to 500° F. in the first polymerization zone in the presence of the silica-alumina catalyst and between 325° and 385° F. in the second polymerization zone in the presence of the phosphoric acid type catalyst. Pressures for both polymerization zones are substantially the same and in the range between 750 and 2000, preferably 1000 to 2000, pounds per square inch gage. The reactions of polymerization of olefins are exothermic and, consequently, the temperature of the gas mixture as it passes through a bed of preferred catalyst tends to rise and, therefore, it may be necessary to provide intermediate cooling between the respective polymerization zones and other equipment. By the present process, however, the effluent from the first polymerization zone can be passed directly to the second polymerization zone without any intermediate separation of the products. Since the olefins are first contacted with the catalyst which tends to form heavy polymers, but are withdrawn before undesirable extensive polymerization occurs, the effluent from the first polymerization zone may be passed directly, with the possible exception of temperature adjustment, to the second zone wherein it is further contacted and polymerized with a catalyst which tends to form light polymers. As stated, before, the polymerization will be conducted at a conversion level between 40 and 60%, preferably 50%, in the first zone and between 35 and 45% in the second zone, for a total in the two zones between 75 and 95%. Thus in each zone temperature, pressure and space velocity may be regulated so that excessive contact and conversion in the presence of each type of catalyst can be avoided while at the same time the desired total conversion is obtained without the formation of undue amounts of undesired products.

The invention may employ as a preliminary treatment any suitable method for the removal of sulfurous material such as hydrogen sulfide and low boiling mercaptans, dienes and other gases which may interfere with the normal functioning of the catalysts or the production of polymers of sufficient purity for ready incorporation with refined gasolines. On the other hand, the products may be subjected to any of the ordinary chemical treatments employed on cracked distillates, such as a limited amount of sulfuric acid, caustic soda, sweetening reagents and the addition of small amounts of inhibitors.

After a period of conversion the catalysts become contaminated with carbonaceous deposits and deactivated. Regeneration of both of the two catalysts may be effected in conventional manner, such as burning out the carbonaceous material by the use of oxidizing gas mixtures of low oxygen content. Particularly with the phosphoric acid type catalyst the temperature of regeneration should be carefully controlled not to exceed about 925° F. If the phosphoric acid has become undesirably dehydrated during the regeneration it may be rehydrated by treatment with steam at elevated temperatures. Conventional purging of the catalyst before regeneration to remove volatile hydrocarbons and after regeneration to remove adsorbed oxygen is preferably employed. The final purge may be so arranged that the catalyst bodies are left at a temperature suitable for immediate resumption of the process.

In an example of the present process, a feed stream comprising a refinery $C_3$—$C_4$ cut containing 25% $C_3$ and $C_4$ olefins is preheated to a temperature of 350° F. at a pressure of 1,000 pounds per square inch gage and is passed through two catalyst zones in series. The first zone contains a silica-alumina catalyst and the second a solid phosphoric acid type (ortho phosphoric acid on kieselguhr). A space velocity of 0.75 volumes of liquid feed per volume of catalyst per hour is maintained, resulting in a conversion of about 40% in the first reactor. The total conversion of the effluent from the second catalyst zone is about 95%. The resulting debutanized polymer is found to consist almost entirely of gasoline boiling range hydrocarbons, only 4% of the product boiling above the 400° F. end-point of the gasoline fraction. The debutanized gasoline has an ASTM octane number of 81 clear and shows the following ASTM distillation data:

| Percent: | Temp., °F. |
|---|---|
| 0 | 204 |
| 5 | 220 |
| 10 | 228 |
| 20 | 243 |
| 30 | 255 |
| 40 | 270 |
| 50 | 280 |
| 60 | 302 |
| 70 | 318 |
| 80 | 335 |
| 90 | 361 |
| E. P. | 400 |

In a comparative run over the silica-alumina catalyst alone, under similar conditions, the same olefinic feed stock was polymerized to a product containing 7.4% heavy polymer at 56.6% conversion and 26.7% heavy polymer at 91.8% conversion. In a similar treatment with phosphoric acid type catalyst, alone, a large amount of light polymers were formed.

From a consideration of the foregoing, it is readily seen that advantageous and highly desirable results can be obtained by operating according to the present process. A polymer product is obtained which is almost exclusively in the higher gasoline boiling range and possesses excellent gasoline blending properties. The formation of excessive amounts of undesirable products is avoided.

I claim:

1. An improved process for the polymerization of olefins of from three to five carbon atoms which comprises preheating said olefins to a temperature of about 350° F., passing the preheated olefins over a silica-alumina catalyst in a first polymerization zone under a pressure of about 1,000 pounds per square inch gage to effect polymerization of said olefins at a conversion level between about 40 and about 60 per cent, withdrawing a partially polymerized effluent from said first polymerization zone, passing said effluent directly over a solid phosphoric acid-type catalyst in a second polymerization zone at a temperature of about 350° F. and under a pressure of about 1000 pounds per square inch gage to effect further polymerization to a total conversion of from 75 to 95 per cent, and recovering polymerized olefins consisting essentially of those having from eight to twelve carbon atoms per molecule as a product from a resulting effluent.

2. An improved process for the polymerization of low-boiling, normally gaseous olefins which comprises preheating said olefins to a temperature between 200° and 500° F., passing the preheated olefins over a silica-alumina type catalyst in a first polymerization zone under a pressure between 750 and 2000 pounds per square inch gage to effect polymerization of said olefins at a conversion level between about 40 and about 60 per cent, withdrawing a partially polymerized effluent from said first polymerization zone, passing said effluent directly over a solid phosphoric acid-type catalyst in a second polymerization zone at a temperature between 325° and 385° F. and under a pressure between 750 and 2000 pounds per square inch gage to effect further polymerization to a total conversion of from 75 to 95 per cent, and recovering polymerized olefins in the gasoline boiling range as a product from a resulting effluent.

3. A process according to claim 2 in which said low-boiling olefins are olefins of from three to five carbon atoms per molecule.

4. An improved process for the polymerization of a hydrocarbon mixture containing olefins of from three to five carbon atoms which comprises preheating said hydrocarbon mixture to a temperature between 200° and 500° F., passing the preheated mixture over a silica-alumina catalyst in a first polymerization zone under pressure between 750 and 2000 pounds per square inch gage to effect polymerization of said olefins at a conversion level between about 40 and about 60 per cent, withdrawing a partially polymerized effluent from said first polymerization zone, passing said effluent directly over a solid phosphoric acid-type catalyst in a second polymerization zone at a temperature between about 325° and about 385° F. and under a pressure between 750 and 2000 pounds per square inch gage to effect further polymerization to a total conversion of from 75 to 95 per cent, and recovering polymerized olefins in the gasoline boiling range as a product from a resulting effluent.

5. A process according to claim 4 in which said olefinic hydrocarbon mixture is a propane-propylene hydrocarbon mixture containing between about 10 and about 30 mol per cent olefins.

6. A process according to claim 4 in which said olefinic hydrocarbon mixture is a butane-butylene hydrocarbon mixture containing about 10 to about 30 mol per cent olefins.

7. An improved process for the preparation of gasoline which comprises polymerizing low-boiling olefins of from three to five carbon atoms at a temperature between 200° and 500° F. and a pressure between 750 and 2000 pounds per square inch in the presence of a silica-alumina catalyst at a conversion level between about 40 and about 60 per cent, withdrawing the partially polymerized effluent from said first polymerization zone, passing said effluent directly over a solid phosphoric acid-type catalyst in a second polymerization zone at a temperature between 325° and 385° F. and under a pressure between 750 and 2000 pounds per square inch gage to effect further polymerization to a total conversion of from 75 to 95 per cent, and recovering polymerized olefins consisting essentially of those having from eight to twelve carbon atoms per molecule as a gasoline product from a resulting effluent.

8. An improved process for the preparation of gasoline which comprises polymerizing low-boiling olefins of from three to five carbon atoms at a temperature between 200° and 500° F. and a pressure between 750 and 2000 pounds per square inch in the presence of a silica-alumina catalyst at a conversion level between about 40 and about 60 per cent, withdrawing the partially polymerized effluent from said first polymerization zone, passing said effluent directly over a solid phosphoric acid-type catalyst in a second polymerization zone at a temperature between 325° and 385° F. and under a pressure between 750 and 2000 pounds per square inch gage to effect further polymerization to a total conversion of from 75 to 95 per cent, recovering polymerized olefins having eight to twelve carbon atoms per molecule and blending the last said olefins with a light gasoline.

9. The process of claim 8 wherein the light gasoline is a natural gasoline.

10. The process of claim 8 wherein the light gasoline is a synthetic gasoline produced by synthesizing carbon monoxide and hydrogen.

11. An improved process for the preparation of a heavy gasoline which comprises successively treating a hydrocarbon mixture containing propylene and butylenes in the presence of a silica-alumina catalyst at a temperature of about 350° F. and under a pressure of about 1000 pounds per square inch gage to effect polymerization at a conversion level between about 40 and about 60 per cent then directly treating the resulting reaction effluent in the presence of a solid phosphoric acid-type catalyst at a temperature of about 350° F. and a space velocity of about 0.75 volumes of liquid feed per volume of catalyst per hour and under a pressure of about 1000 pounds per square inch gage to effect further polymerization to a total conversion of from 75 to 95 per cent, and separately recovering said heavy gasoline, consisting essentially of olefin polymers of from eight to twelve carbon atoms per molecule, as a product from the resulting effluent.

References Cited in the file of this patent

UNITED STATES PATENTS

| Number | Name | Date |
| --- | --- | --- |
| 2,126,001 | Fulton et al. | Aug. 9, 1938 |
| 2,188,638 | Atwell | Jan. 30, 1940 |
| 2,318,719 | Schneider et al. | May 11, 1943 |
| 2,400,621 | Alther | May 2, 1946 |
| 2,404,340 | Zimmerman | July 16, 1946 |
| 2,493,454 | Hagy | Jan. 3, 1950 |

FOREIGN PATENTS

| Number | Country | Date |
| --- | --- | --- |
| 510,155 | Great Britain | July 26, 1939 |